Nov. 14, 1939.  A. E. GLANCY  2,179,850
OPTICAL SYSTEM FOR MEASURING CHANGES IN MAGNIFICATION
Filed March 17, 1937  3 Sheets-Sheet 1
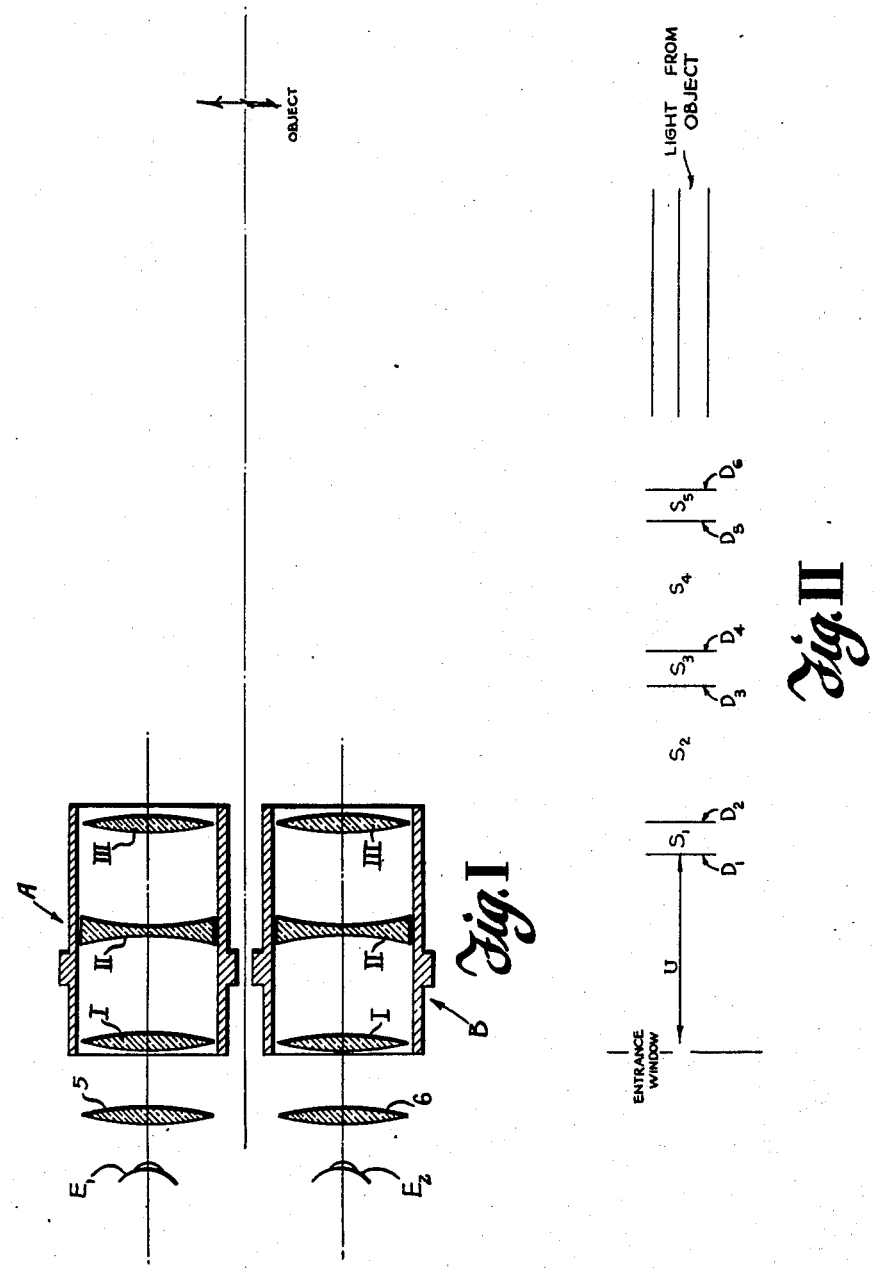
INVENTOR
ANNA ESTELLE GLANCY
BY
Harry H. Styll
ATTORNEY

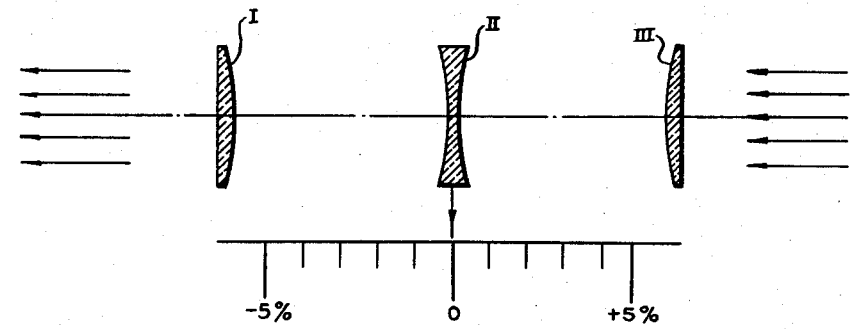
*Fig.* III
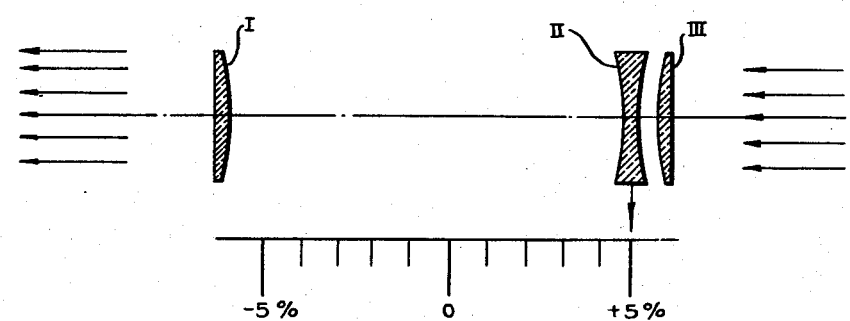
*Fig.* IV
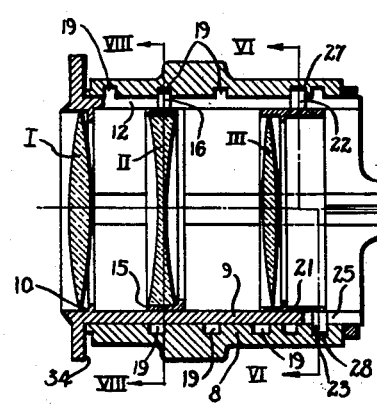
*Fig.* V
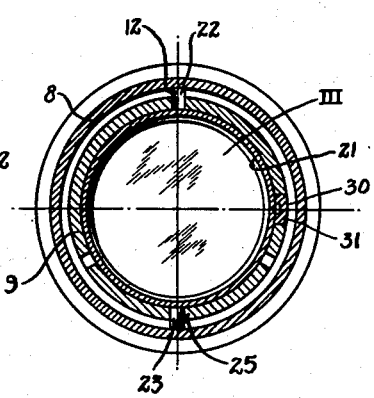
*Fig.* VI
INVENTOR
ANNA ESTELLE GLANCY
BY
Harry H. Styll
ATTORNEY Nov. 14, 1939.  A. E. GLANCY  2,179,850
OPTICAL SYSTEM FOR MEASURING CHANGES IN MAGNIFICATION
Filed March 17, 1937    3 Sheets-Sheet 3
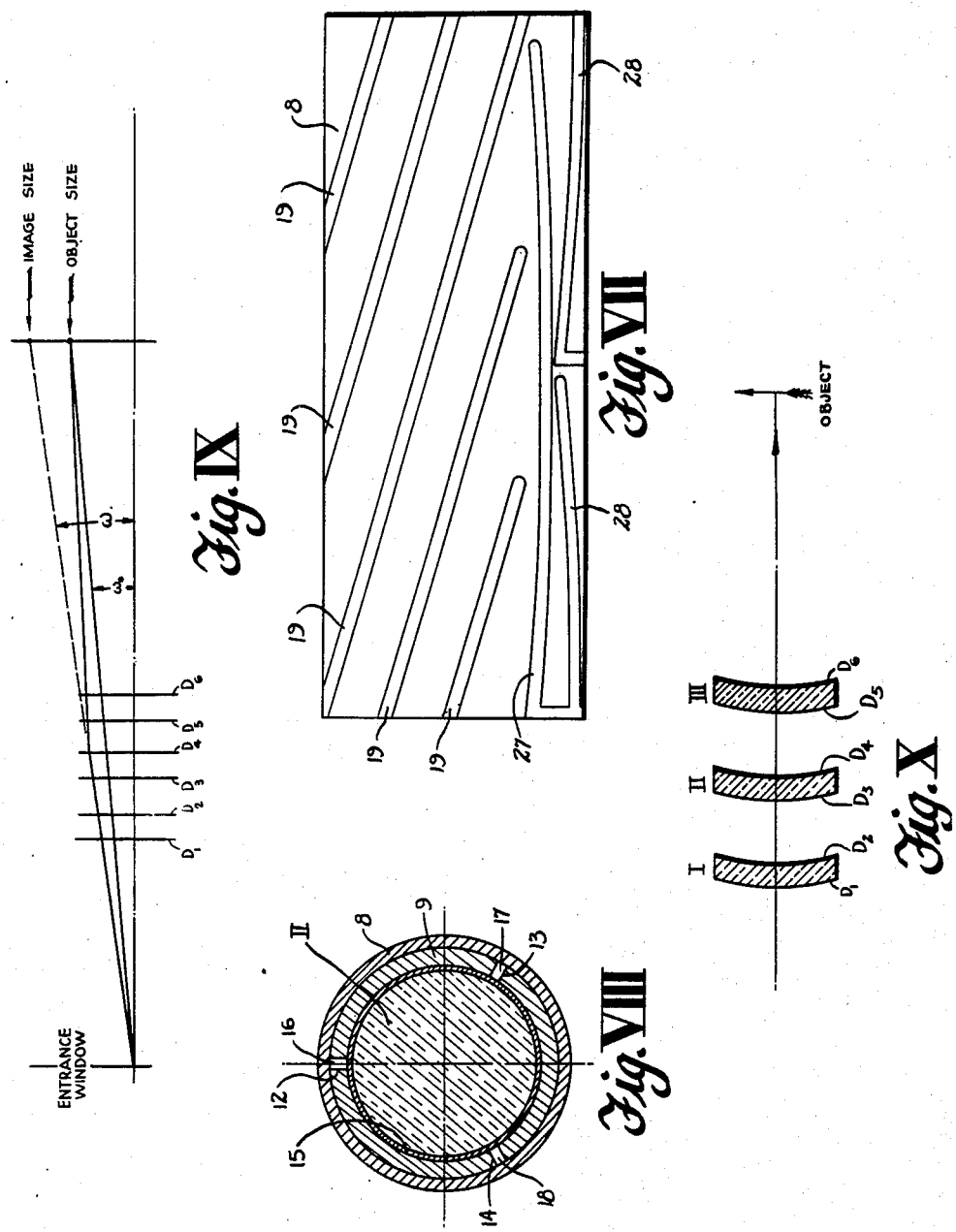
INVENTOR
ANNA ESTELLE GLANCY
BY
Harry H. Styll.
ATTORNEY Patented Nov. 14, 1939

2,179,850

UNITED STATES PATENT OFFICE 2,179,850

OPTICAL SYSTEM FOR MEASURING CHANGES IN MAGNIFICATION

Anna Estelle Glancy, Southbridge, Mass., assignor to American Optical Company, Southbridge, Mass., a voluntary association of Massachusetts Application March 17, 1937, Serial No. 131,352

5 Claims. (Cl. 88—1)

The present invention relates to the measurement of the magnification produced by an optical system, and in fact involves an optical system having a peculiar property with regard to the image produced by the system when maintained at a given distance from an object, in that by varying the separation of the lens elements of the system a graduated amount, the system is capable of producing measurable changes in the angular size of the resulting image without change in the focal power of the system.

When using an optical system embodying the present invention for producing such measurable changes in magnification without change in focal power, the variations in the separation of the lens elements for the purpose of varying the magnification do not change the image position in space. Such an optical system is useful, therefore, as an attachment for other instruments or devices where it is found advantageous to increase the angular size of the image produced. For instance, I have disclosed and claimed in my copending application Serial No. 137,229, filed April 16, 1937, an attachment for a lens testing or measuring instrument, said attachment having the function of increasing the size of image without introducing any error in the reading of the instrument due to changed focal power.

An optical system in accordance with the present invention has a particularly important field of usefulness in connection with the testing and compensating of certain abnormal conditions of the human visual mechanism involving the relative size and shape of the ocular images of the two eyes and known as "aniseikonia". An arrangement of the lens elements is described and claimed in the patent of Kenneth N. Ogle, 2,107,-305, dated Feb. 8, 1938, which permits gradual change of the angular size of image while the focal power is not substantially affected. Two lens elements are so mounted that the separation of the elements can be carefully regulated. However, theoretically there are slight inherent errors in the system particularly in that slight changes occur in the focal power as the separation of the elements is increased or decreased. Although these errors are in many instances negligible because within physiologically substantially ineffective limits, it is often desirable to make theoretically correct measurements.

An object of the present invention is to provide a device for testing image properties of eyes by effecting continuous change in the size of the ocular image for a given distance without change of the position of the image in space, the device comprising at least three lens elements constituting an optical system whose focal power is constant, including zero as a constant.

Another object of the present invention is to provide such a device which is theoretically correct. A further object of the present invention is to provide such a device by which the true reciprocal magnification may be accurately read off from a scale.

A further object of the invention is to provide a somewhat simpler device which is not theoretically correct, but which has such slight error in the measurement of small changes in reciprocal magnification as to give usable results.

In the accompanying drawings which illustrate my invention:

Fig. I shows diagrammatically an arrangement of optical systems and lenses for testing the eyes of a patient in accordance with my invention;

Fig. II is a diagram relating the optical surfaces of three lenses for measuring magnification with object at infinite distance.

Fig. III illustrates schematically a specific example of a lens system for use in such tests with a distant object;

Fig. IV shows schematically the rearrangement of the lenses of Fig. III to give 5% magnification;

Fig. V is a view in axial section of mechanism for moving lenses of a system in accordance with the principles of my invention;

Fig. VI is a sectional view on the line VI—VI of Fig. V;

Fig. VII is a developed view of the cylinder which is rotated for controlling the lens movement with the mechanism of Fig. V;

Fig. VIII is a sectional view on the line VIII—VIII of Fig. V;

Fig. IX illustrates schematically a specific example of a lens system for use in such tests with a near object; and Fig. X is a diagram relating the optical surfaces of three lenses for measuring magnification with a near object.

I will first explain the principles underlying the present invention and then describe their embodiment in usable structures as illustrated in the drawings.

As above explained, a two-lens system employed for varying the magnification or angular size of image by change in the separation of the lens elements has the inherent defect that such variation in the separation of the lens elements entails a change in the focal power of the system. Although it is true that in the range of most commonly used powers these changes can be kept within physiologically substantially ineffective limits, it is often desirable to have available a system which is free from such limitations. In accordance with my invention I control the power of such an optical system so as to maintain its power constant by the addition of one more movable lens. The motion of any one of the three causes a variation both in magnification and in power, but the simultaneous motion of any two can be so related that the power is held constant while the magnification varies.

Take for example the lens systems A and B illustrated diagrammatically in Fig. I. If either system depended merely upon the variation in the separation between two lenses to obtain changes in the angular size of image of the object viewed, such variation in separation would entail fluctuation in the power of the system. Instead, two separations are involved according to my invention. Assume that lens I in each system remains in fixed relation to the eye. Shifting of lens II relative to lens I is accompanied by such changes in the separation between lens II and lens III as to maintain the focal power of the system approximately or completely unchanged, depending upon whether lens III remains in fixed relation to lens I or is also shifted. In case lens III remains fixed as lens II is shifted to vary the angular size of image, the change in the separation between lens I and lens II is equal to but opposite in sign to the change in the separation between lens II and lens III. As will be shown later, this is almost but not quite capable of maintaining the focal power of the system constant. For accurate work, the separation between lens II and lens III should change at a sufficiently different rate from the rate of change of the separation between lens I and lens II so that some slight movement of lens III is required. Mechanism for moving lens III in the required relation to lens II as the latter is moved toward and from lens I is shown in Figs. V to VIII inclusive and will be described below.

The manner in which the eyes of a patient are tested for distance vision is diagrammatically illustrated in Fig. I. The eyes are indicated at $E_1$ and $E_2$. Such power correction as the patient requires for correct distance vision is provided by the power lenses 5 and 6. A system comprising lenses I, II and III is placed in front of each eye. The determination of the size correction required by the patient is made by adjusting lens II of systems A, or of system B, while at the same time keeping the object and image planes coincident by the required movement of lens III until the out of balance condition in the two eyes is equalized. The per cent magnification in each system is derived from the position of lens II. As will later be shown from the equations for the relations between the lenses, a linear scale may be used if in our measurements we deal with 1÷magnification, or the reciprocal of magnification. This reciprocal will be dealt with in the present specification including the mathematical formulae; and it will be noted that thereby a simple linear scale is rendered theoretically correct. In practice the scale on the instrument can be itself linear provided a conversion table is used to give the magnification to be ascertained, for instance for designing the prescription lens. On the other hand a non-linear scale giving the magnification directly can be carried by the instrument instead of a linear scale.

As the two systems for the two eyes function in the same way, the description of the invention will be confined from this point on to a single system. It will clarify the principle involved to take the specific example illustrated in Figs. III and IV. In this example the lens elements are so selected as to produce no optical power. Moreover, for simplicity in calculation, the two outer lenses have the same power, and their outer surfaces are plane. Moreover, the two outer lens elements are positive, and the intermediate lens element is negative. It will be assumed that the index of refraction of the glass is 1.5232. In order that the reciprocal magnification may be read off on a scale in which 2 mm. represents 1% magnification, we select the two outer lenses as having each a convex side of radius 216.08 mm. having a power of 2.4214 diopters, the center being 1.6 mm. thick. The power of each of the surfaces of the negative middle lens is −2.4938 diopters, the radius of each being 209.80 mm., the center being 3.046 mm. thick. The power of this system is zero.

Either one of the two outer lenses may be assumed to be fixed. The middle lens is moved along the scale (in which each interval is 2 mm. long and represents 1% magnification) in either direction from the central position at which magnification is unity. If moved to the right, as shown in Fig. IV, there is an increase in size of image, and if moved to the left there is a decrease in size of image. At the zero setting, the separation of the two plane surfaces of the outer lenses is 30.25 mm. while at +5% magnification that separation has decreased to 29.77 mm. and at −5% that separation is likewise 29.77 mm.

It will be noted that the movement of the outer lens is slight, so slight indeed that it is required only for unusually accurate determinations. Quite accurate results are obtained with both outer lenses stationary if the scale indicating the reciprocal magnification be changed to compensate the error thus introduced. On the minus side of the scale, each 2 mm. should be equivalent to −0.975% instead of 1%; and on the plus side, each 2 mm. should be equivalent to +1.025%.

I will now give a specific example which is usable for reciprocal magnifications up to ±10%. Again it is assumed that the index of refraction is 1.5232. The outer surface of each of the outer lenses is plane and the other surface of each is convex. The radius of the latter surface of lens I is 219.83 mm. or a power of 2.380 diopters, and the radius of this surface of lens III is 220.30 mm. or a power of 2.375 diopters; and the thickness of both lens I and lens III at the center is 1.904 mm. The radius of each of the surfaces of the negative middle lens is 209.08 mm. or a power of −2.5024 diopters, the center being 1.523 mm. thick. The power of this system is zero.

Assume that either lens I or lens III is fixed. The middle lens II is moved along a scale in which each interval is 2 mm. long and represents 1% magnification, the movement taking place in either direction from the approximately central position at which magnification is unity. As before, if lens II is moved to the right (toward lens III) along the scale, there is a decrease in size of image, and if moved to the left (toward lens I) there is an increase in size of image. At the zero setting, in which the adjacent surfaces of lenses I and II are separated by 20.80 mm. and the adjacent surfaces of lenses II and III by 21.00 mm., the separation of the two plane (outer) surfaces of lenses I and III is 47.14 mm. If the middle lens II is moved to the right to the +10% position, the separation of these two plane (outer) surfaces changes to 45.43 mm., while the separations between the adjacent surfaces of I and II, and II and III become 39.09 mm. and 1.00 mm. respectively.

Although the movement of the outer lens is here somewhat greater than in the first example, it is not so large as to be significant or even essential for fairly accurate results. Moreover, quite accurate results are obtained with both outer lenses stationary by compensating changes in the two portions of the scale extending from the unit position. On the minus side of the scale, each 1% change in reciprocal magnification would correspond to 2.014 mm. or in other words 2 mm. would correspond to 0.993% reciprocal magnification. On the plus side of the scale, each 1% change in reciprocal magnification would correspond to 1.912 mm. or in other words 2 mm. would correspond to 1.046% reciprocal magnification.

The examples given were selected because of the slight movement required of lens III and because of the insignificant error introduced when lens III is held stationary and adjustment made of the scale in compensation. The principles of my invention apply nonetheless when the optics of the system are such that greater movement of lens III (or lens I) is required in compensation, although in general the errors introduced by holding this lens stationary cannot be taken care of to so full an extent in such cases.

The equation given below representing the required movement of one of the outer lenses in order to hold the power of the optical system constant is of the second degree and its curve is a symmetrical parabola with a maximum at the zero position of the middle lens.

As above noted, the rigorous determination of the relative magnification of image obtained as an incident to the testing of eyes or the testing of prescription lenses requires that an end lens move the required amount when the middle lens is moved to the setting for a given magnification, to keep object and image planes coincident. Mechanism for imposing the necessary restricted movements on an end and the middle lenses is illustrated diagrammatically in Figs. V to VIII inclusive.

The positions of the two movable lenses relative to the third lens are determined by a rotatable adjusting device 8. This device may, for convenience, be a sleeve rotatably carried by the tube or housing 9 for the lenses I, II and III. The tube 9 provides in its end a stationary mounting 10 for the lens I. The tube 9 has, furthermore, three slots 12, 13 and 14 for guiding the lenses II in its longitudinal movements so that it does not turn about its axis. Only one of these slots, the slot 12, is shown in Fig. V for clarity in illustration. Lens II is carried in a collar 15 from which three pins 16, 17 and 18 project, one of these pins projecting through each of the slots in the tube 9. One of these pins, the pin 16, is shown in Fig. V cooperating with the slot 12.

The ends of these pins project into spiral depressions or grooves 19 in the inside of the sleeve 8. All of these grooves have the same pitch and are spaced longitudinally of the sleeve 8 the proper amount for maintaining the plane of the lens II normal to the axis of the tube 9. By rotating the sleeve 8 relative to the tube 9, the pins 16, 17 and 18 are caused to travel along the slots 12, 13 and 14 in the tube 9, carrying the lens II longitudinally of the latter. By reversing the direction of rotation, the lens II can, of course, be caused to travel in the opposite direction.

The lens III is also carried in a collar 21 from which two pins 22 and 23 project. One of these pins, the pin 22, is shown in Fig. V projecting through the slot 12. This end of the tube 9 is provided with a short slot 25 diametrically opposite the slot 12, and the other pin 23 projects through the slot 25. The pins 22 and 23 engage in depressions or grooves 27 and 28 respectively, these grooves being in the inside of the sleeve 8 adjacent this end of the sleeve. These grooves have the curvature of a parabola as above noted, and cause the lens III to move slightly toward lens I as the sleeve 8 is rotated in either direction from the zero setting, or middle position of the lens II. The grooves 27 and 28 cause the lens III to be most remote from lens I at this middle position of the lens II where the increase in magnification is zero.

The reciprocal magnification is indicated by a slide 30 attached to the collar 21 as it slides relative to a scale 31 attached to the collar 15. Support for the scale 31 is provided by an extension 32 of the tube 9. From Fig. VI it will be seen that the scale 31 moves in a slot in the tube 9 and extension 32, and that the slide 30 is guided by the scale 31.

It will become evident from the equations given below that the reciprocal magnification is indicated by the movement of lens II relative to lens III; and that therefore, in general, the relative rotation between tube 9 and sleeve 8 does not quite accurately give the reciprocal magnification. However, in some cases the errors are so small that, for results which do not require rigorous accuracy, the indicator and scale may be respectively on the flange 34 and on the adjacent edge of the sleeve 8, or vice versa.

The mathematical basis for my improvement in the measurement of magnification for distance vision by an optical system of three or more lens elements will now be explained in connection with Fig. II.

*Object at infinity*

In the application of E. D. Tillyer, Serial No. 720,594, filed April 14, 1934, is given an expression for the angular magnification of a distant object by a lens or lens system $M'=S'.P'$ where $S'$ is a factor depending on all the surface powers except the last refractive surface, (the one nearest the stop point), and upon the optical thicknesses and separations, but independent of the total power of the system, and $P'$ is a factor depending on the total power of the system and the position of the stop. This relation, or rather, $$\frac{1}{M'}=\frac{1}{S'}\cdot\frac{1}{P'}$$

is the basis of my equations, and I find it more convenient to introduce the following notation: Let $$M_p=\frac{1}{M'} \quad S_p=\frac{1}{S'} \quad P_p=\frac{1}{P'}$$

Then $$M_p=S_p.P_p \qquad (1)$$

As a basis for my invention respecting a distant object, I shall hold Pp constant.

$$P_p = \text{Constant} \quad (1a)$$

and give $M_p$ a finite variation. Therefore, $$\frac{\Delta M_p}{M_p} = \frac{\Delta S_p}{S_p} \quad (1b)$$

The subscript $p$ refers to the number of refractive surfaces.

In Fig. II it is assumed that lenses I, II, and III have each finite thickness and herefore, $p=6$.

Let $D_1$, $D_2$, $D_3$, $D_4$, $D_5$, and $D_6$ be the surface powers of the lenses in the order beginning with the surface nearest the stop point.

By definition, equivalent power is the reciprocal of the focal length referred to the principal planes of a lens or a system of lenses; and effective power is the reciprocal of the focal length referred to the last refractive surface of a lens or system of lenses, or, the reciprocal of the "back focal length".

I define additive power as the difference between the effective power of a system and the effective power of a posterior part of the system. For example, if $D_{II}$ is the effective power of lens II taken alone, and $D_{II+III}$ is the effective power of partial system (II+III), the additive power of lens III in the partial system (II+III) is $$(D_{II+III} - D_{II})$$

by definition.

Let $D_I$ $D_{II}$ $D_{III}$ be the "effective" powers of the lenses I and II and III, respectively.

Let $$\frac{1}{EFL_I}, \frac{1}{EFL_{II}}, \frac{1}{EFL_{III}}$$

be the "equivalent" powers of lenses I and II and III, respectively.

Let $D_{II+III}$ be the effective power of the partial system made up of lenses II+III.

Let $$\frac{1}{EFL_{II+III}}$$

be the equivalent power of the partial system made up of lenses II+III.

Let $D_e$ be the effective power of the system made up of lenses I+II+IIII.

Let $$\frac{1}{EFL}$$

be the equivalent power of the system made up of lenses I+II+III.

Let $AD_{III}$ be the "additive" power of lens III with respect to lens II.

General theory

From the usual Gaussian relations for paraxial rays in a system of $p$ refractive surfaces in which $u$ and $v$ represent object and image distances, respectively, $$\frac{1}{EFL} = -\left(\frac{u_2}{v_1} \frac{u_3}{v_2} \frac{u_4}{v_3} \cdots \frac{u_p}{v_{p-1}}\right) De \quad (2)$$

It can also be proved by lengthy developments that $$\frac{1}{EFL} = S_p \cdot De \quad (3)$$

Therefore, $$S_p = -\frac{u_2}{v_1} \frac{u_3}{v_2} \frac{u_4}{v_3} \cdots \frac{u_p}{v_{p-1}} \quad (4)$$

It can also be proved that $$P_p = 1 - U \cdot De \quad (5)$$

The Gaussian object and image distances are expressible in terms of index of refraction, surface curves, thicknesses and separations. It can be shown by lengthy developments that for lens I alone (where $p=2$)

$$S_2 = -\frac{u_2}{v_1} = 1 - s_1 D_2 \quad (6)$$

For lens system I+II (where $p=4$)

$$S_4 = -\frac{u_2}{v_1} \frac{u_3}{v_2} \frac{u_4}{v_3} =$$
$$(1-s_3D_4)[(1-s_1D_2)(1-s_2D_{II}) - s_1D_{II}] \quad (7)$$

Three-lens system

For lens system I+II+III (where $p=6$)

$$S_6 = -\frac{u_2}{v_1} \frac{u_3}{v_2} \frac{u_4}{v_3} \frac{u_5}{v_4} \frac{u_6}{v_5} \quad (8)$$

$$= (1-s_5D_6)[(1-s_3D_4)(1-s_4D_{III}) - s_3D_{III}]$$
$$[(1-s_1D_2)(1-s_2D_{II+III}) - s_1D_{II+III}]$$

$$= \frac{(1-s_5D_6)}{(1-s_3D_4)} \Big\{ (1-s_3D_4)[(1-s_1D_2)(1-s_2D_{II}) - s_1D_{II}]$$
$$[(1-s_3D_4)(1-s_4D_{III}) - s_3D_{III}] -$$
$$s_1D_{III} - s_2(1-s_1D_2)D_{III} \Big\}$$

The following are well-known relations for single lenses.

$$D_I = D_1 + \frac{D_2}{1-s_1D_2} \quad \frac{1}{EFL_I} = (1-s_1D_2)D_I$$

$$D_{II} = D_3 + \frac{D_4}{1-s_3D_4} \quad \frac{1}{EFL_{II}} = (1-s_3D_4)D_{II} \quad (9)$$

$$D_{III} = D_5 + \frac{D_6}{1-s_5D_6} \quad \frac{1}{EFL_{III}} = (1-s_5D_6)D_{III}$$

It can be proved that $$AD_{III} = \frac{D_{III}}{(1-s_3D_4)[(1-s_3D_4)(1-s_4D_{III}) - s_3D_{III}]} \quad (10)$$

By definition $$D_{II+III} = D_{II} + AD_{III} \quad (11)$$

Let lenses II and II be movable.

Let $\Delta s_6$, $\Delta s_2$, $\Delta s_4$ be finite changes in $S_6$, $s_2$, $s_4$, respectively.

We will now impose the condition that the effective power of the system shall be constant, i e., $$De = \text{constant} \quad (12)$$

It can be shown by lengthy developments that the mathematical relation expressing the movement of II and III without changing the effective power of the system, $De$, is $$-(1-s_3D_4)^2 \Delta s_4 = \frac{\Delta s_2 \left[1 + \frac{D_{II}}{AD_{III}}\right]^2}{1 - \Delta s_2 \left[1 + \frac{D_{II}}{AD_{III}}\right] D_{II}} \quad (13)$$

and as a further consequence of a constant power system $$P = 1 - U \cdot De = \text{constant} \quad (14)$$

Further, it can be shown by lengthy developments that the per cent change in magnification, with respect to the magnification corresponding to the initial position of the lenses, or the zero of the instrument, is given by $$\frac{\Delta M_6}{M_6} = \frac{\Delta S_6}{S_6} = -\frac{D_{II}}{D_{II+III}} \cdot AD_{III}(1-s_3D_4)^2 \Delta s_4 \quad (15)$$

In all the above equations referring to moving lenses, it is to be understood that the variables $s_2$, $s_4$ and $s_6$, have the values for the initial positions.

The Equations 1, 8, 12, 13, 14, 15 are the fundamental relations for a system of three thick lenses, one of which is fixed and the other two are movable, and in which the "power" factor of the magnification is held constant and $M_6$ is made to vary, the variations being proportional to the motion of one movable lens with respect to the other movable lens, the object being at infinity.

Note that $D_1$ does not occur in $S_6$ in Equation 8. Therefore, since $D_1$ can have any value, $S_6$ is independent of the effective power of the system. Also, since $D_1$ can have any value, the system can have any arbitrary effective power.

Equation 15 gives the scale value for a change in $S_6$ for a given motion of II and III. The factor to be multiplied by $\Delta s_4$ is constant. Therefore $S_6$ changes in direct proportion to the change in separation between II and III. Hence a linear scale attached to III can be used to express $$\frac{\Delta S_6}{S_6} \text{ or } \frac{\Delta M_6}{M_6}$$

As applied to ophthalmic tests for size in distance vision $D_e$ should be zero and $P_p$ should be unity and $M_p$ should equal $S_p$. Since $D_e$ equals zero, the power term $P_p$ is independent of the distance to the eye. Both the entering and the emergent rays are parallel, and lens I and lens II can be made movable, or lens II and lens III, also the whole system can be moved along its axis.

*Object at a finite distance*

In developing the theory for a finite object distance, (see Figs. IX and X), the principle of a constant power system will be carried out by assuming a terrascopic system of three thick lenses. In a terrascopic system the image and the object lie in the same plane. Strictly, the power is not constant if any of the lenses are movable. However, as applied to near objects, I proceed on the basis that a terrascopic system has constant power in the sense that the vergency of the light is not altered by passage through the system.

The advantage of a terrascopic system is this: when the object and image lie in the same plane, angular magnification is equal to linear magnification.

$$M = \frac{\omega}{\omega_0} = \frac{\text{Linear image size}}{\text{Linear object size}}$$

where M is the near vision magnification.
In the usual Gaussian notation:

$$\text{Linear magnification} = \frac{v_1}{u_1}\frac{v_2}{u_2}\frac{v_3}{u_3}\frac{v_4}{u_4}\frac{v_5}{u_5}\frac{v_6}{u_6}$$

and therefore, $$\frac{1}{M} = \left(\frac{u_2}{v_1}\frac{u_3}{v_2}\frac{u_4}{v_3}\frac{u_5}{v_4}\frac{u_6}{v_5}\right)\cdot\frac{u_1}{v_6} \quad (16)$$

in which $u_1$ is a finite object distance, measured from $D_6$, and $v_6$ is the distance from the last refractive surface $D_1$ to the common object-image plane.

By the introduction of a fictitious distance system, some of the equations for a distant object can be used in the theory for an object at finite distance, as follows.

For a refraction at the surface $D_6$, the Gaussian relation between object and image distance can be written:

$$\frac{1}{v_1} = D_6 - \frac{1}{u_1}$$

where $u_1$ is finite or $$\frac{1}{v_1} = \overline{D_6}$$

for an object at infinity where $$\overline{D_6} = D_6 - \frac{1}{u_1} \quad (17)$$

i. e., the same image position results whether an object at finite distance $u_1$ is refracted at the surface $D_6$, or an infinitely distant object is assumed to be refracted at a fictitious surface $$\overline{D_6}$$

In Equation 16 all the object and image distances, with the exception of $u_1$, are the same in the real near vision system as in the fictitious distance system. Therefore, the image distance $v_6$ is the back focal length in the fictitious distance system.

Let a dash over the quantities indicate the fictitious system $$\frac{1}{v_6} = \overline{D_e} \quad (18)$$

By Equations 16 and 18

$$\frac{1}{M} = \frac{u_2}{v_1}\frac{u_3}{v_2}\frac{u_4}{v_3}\frac{u_5}{v_4}\frac{u_6}{v_5}\cdot u_1\cdot\overline{D_e} \quad (19)$$

and by Equation 4

$$\overline{S_6} = -\frac{u_2}{v_1}\frac{u_3}{v_2}\frac{u_4}{v_3}\frac{u_5}{v_4}\frac{u_6}{v_5} \quad (20)$$

Therefore, $$\frac{1}{M} = -\overline{S_6}\cdot u_1\cdot\overline{D_e} \quad (21)$$

By Equation 8

$$\overline{S_6} = (1-s_5\overline{D_6})[(1-s_3D_4)(1-s_4\overline{D_{III}})-s_3\overline{D_{III}}] \\ [(1-s_1D_2)(1-s_2\overline{D_{II+III}})-s_1\overline{D_{II+III}}] \\ = (1-s_5\overline{D_6})[(1-s_1D_2)(1-s_2D_{II})-s_1D_{II}] \\ [(1-s_3D_4)(1-s_4\overline{D_{III}})-s_3\overline{D_{III}}] - \\ -\frac{(1-s_5\overline{D_6})}{(1-s_3D_4)}[s_1\overline{D_{III}}+s_2(1-s_1D_2)\overline{D_{III}}] \quad (23)$$

By Equation 9

$$\overline{D_{III}} = D_5 + \frac{\overline{D_6}}{1-s_5\overline{D_6}} \quad \frac{1}{\overline{EFL_{III}}} = (1-s_5\overline{D_6})\overline{D_{III}} \quad (24)$$

By Equation 10

$$\overline{AD_{III}} = \frac{\overline{D_{III}}}{(1-s_3D_4)[(1-s_3D_4)(1-s_4\overline{D_{III}})-s_3\overline{D_{III}}]} \quad (25)$$

By Equation 11

$$\overline{D_{II+III}} = D_{II} + \overline{AD_{III}} \quad (26)$$

In place of Equation 12 we have $$v_6 + [s_2 + ns_3 + s_4 + ns_5] = -u_1 = \text{constant} \quad (28)$$

Equations 17 to 28 inclusive, serve for finding the reciprocal magnification (near vision) for the initial position of the lenses. Note that Equation 21 expresses near vision magnification in terms of the object distance and distant vision quantities. Since the system is terrascopic, the exact position of the stop is immaterial, although it is assumed to be on the opposite side of the system from the object and at a finite distance from the object. The designer is led by the above considerations to require a fixed distance between the first refractive surface and the object.

Change in magnification, without change of image position can be accomplished by the proper correlation of finite changes in $\Delta s_2$ and $\Delta s_4$. Let $$\Delta \frac{1}{M}$$

be a finite change in $$\frac{1}{M}$$

$$\Delta \frac{1}{M} = u_1 \cdot \Delta[\overline{S} \cdot \overline{De}] \qquad (29)$$

and the condition that the system shall remain terrascopic is:

$$\Delta v_6 + \Delta s_2 + \Delta s_4 = 0 \qquad (30)$$

Equations 29 and 30 give, in general, a complicated relation between $\Delta s_2$ and $\Delta s_4$, but by a specific choice of details of the system, $$\Delta \frac{1}{M}$$

can be expressed as a linear function of $\Delta s_2$ only.

With proper attention to theory, a system of three lenses can be designed which shall always maintain the image in the object plane and change the reciprocal magnification in direct proportion to the movement of one lens with respect to another.

The following relations refer to one such system, namely, when parallel light passes between II and III. This system simplifies a difficult problem by virtue of the conditions that $$\overline{D_{III}} = 0$$

and the shape term $$\overline{S_6}$$

is almost identical with the shape term for 4 refracting surfaces instead of 6.

*Parallel light between II and III*

Let $S_{I \div II}$ be shape term $S_4$ for the 4 refracting surfaces, $D_1\ D_2\ D_3\ D_4$, parallel light entering $D_4$ (see Equation 7).

The condition that the image shall lie in the object plane for any finite movements of I and II is expressed by two relations:

$$\Delta v_6 = \frac{-(1-s_1 D_2)^2 \left(\frac{1}{EFL_{II}}\right)^2 \Delta s_2}{\left\{\frac{1}{EFL_I} \cdot S_{I+II} + \frac{1}{EFL_{II}}\right\}\left\{\frac{1}{EFL_I} \cdot S_{I+II} + \frac{1}{EFL_{II}} - (1-s_1 D_2)\frac{1}{EFL_I} \cdot \frac{1}{EFL_{II}} \cdot \Delta s_2\right\}} \qquad (31)$$

$\Delta v_6 + \Delta s_2 + \Delta s_4 = 0$
where $$S_{I+II} = \frac{\frac{1}{EFL_{I+II}}}{D_{I+II}} = \frac{1}{(1-s_3 D_4)[(1-s_1 D_2)(1-s_2 D_{II}) - s_1 D_{II}]}$$

in which $s_2$ is the initial separation between I and II.

The condition that the magnification shall be unity in the initial position is conveniently expressed by:

$$\frac{v_1 v_2 v_3 v_4 v_5 v_6}{u_1 u_2 u_3 u_4 u_5 u_6} = 1 \qquad (32)$$

The change in reciprocal magnification is given by:

$$\Delta \frac{1}{M} = u_1 (1 - s_5 \overline{D_6}) \cdot \frac{1}{EFL_I} \cdot \frac{1}{EFL_{II}} \cdot \Delta s_2 \qquad (33)$$

The coefficient of $\Delta s_2$ is constant if III is fixed and therefore the variation $$\Delta \frac{1}{M}$$

can be read on a linear scale, having an indicator which shows the relative motion of I and II.

An example, applied to the surface of the lens system shown in Fig. X, will show how the principles just explained may be practiced. Let the opposite surfaces $D_1$ and $D_2$ of lens I have the powers +4.7986 diopters and −9.7540 diopters respectively and let this lens be 1.371 mm. thick in the center. Let the opposite surfaces $D_3$ and $D_4$ of lens II have the powers +9.7540 diopters and −7.3893 diopters respectively and let this lens be 3.046 mm. thick in the center. Let the opposite surfaces $D_5$ and $D_6$ of lens III have the powers +7.3893 diopters and −5.000 diopters respectively and let this lens be 3.046 mm. thick in the center. It is assumed that the index of refraction of the glass is 1.523 and that the object is at a distance of 400 mm. from the surface $D_6$. By Equation 33 the scale works out on the basis of 2 mm. movement for each percent reciprocal magnification, under the conditions that the combination of lens elements are maintained in the relation defined by Equations 30, 31 so that the object and image planes are coincident. In the zero setting, that is with magnification equal to unity, the separation between surfaces $D_2$ (of lens I) and $D_3$ (of lens II) is 2.00 mm.; and the separation between surfaces $D_4$ and $D_5$ is 3.10 mm. This places surface $D_1$ at a distance of 412.56 mm. from the object plane.

Lens III is kept at a constant distance from the object plane. Lens I is moved to the left to obtain various reciprocal magnifications from 0% to −5% or more, and at the latter reading the separation between surfaces $D_2$ and $D_3$ is, of course, 12 mm. Meanwhile lens II has been moving slightly relative to lens III, as required by Equation 30, and at the −5% position of lens II the separation between surfaces $D_4$ and $D_5$ is 4.04 mm. The movement of lens II makes a scale which is fixed relative to lens III inaccurate; and the scale and indicator should measure the relative movement between lenses I and II each 2 mm. of movement representing 1% change in reciprocal magnification.

The relations between the three lenses may be considerably varied within the principles explained in connection with Equations 29, 30, 31, 32 and 33. For instance, the relations between the three lenses may be such that a change in the separation between surfaces $D_2$ and $D_3$ requires a simultaneous change about three times as large in the separation between surfaces $D_4$ and $D_5$. Such an arrangement can be obtained so as to continue to use a scale in which 2.00 mm. of movement represents 1% change in reciprocal magnification where the powers of the outer lenses I and III are approximately +2.5 diopters each, and the power of the middle lens II is approximately −5 diopters. Here again lenses I and II should be moved in such relation to each other and to lens III that parallel light passes between lenses II and III and so that the image plane is coincident with the object plane.

It will be obvious that by changing the powers of the lenses, the scale value can be changed, as for instance where greater movement for 1% change in reciprocal magnification is desired so as to permit closer readings. In fact the principles of my invention make possible a large variety of designs, having due regard to Equations 29, 30, 31, 32 and 33.

*Variable magnification in one meridian only*

The above discussion has assumed that the same magnification occurs in all meridians. The principles of my invention are applicable furthermore for measuring, or testing, or both testing and measuring magnification in a particular meridian. Referring to the examples described above in connection with Figs. III and IV which are for use at infinite distance, it will be noted that the outer surface of each of the outer lenses is plane and the other surface of each is spherical, in one example the power of the spherical surface of each being 2.4214 diopters. For astigmatic tests or measurements at infinite distance the outer surfaces of the two outer lenses remain plane surfaces, while the other surface of each of these lenses is a plane cylinder. The opposed surfaces of the middle lens are plane cylinders. The powers specified are used for the meridian of variable magnification. Furthermore, the axes of the four plane cylinder faces have the same orientation, thereby giving the lens system one meridian in which each lens acts as a simple parallel plate of glass, at which the refraction takes place normally. It is essential that the axes of all three lenses be aligned carefully.

When the measurements or tests are to be made with the object at a finite distance, the surfaces on all three lenses must be toric. The necessity for providing toric surfaces on the lenses is due to the part played by lens thickness and the separation between lenses in the mathematical equations. If plano cylinders were used, the image would be displaced by the law of refraction for a plane parallel plate; and compensation must be made, equal to the sum of the lens thicknesses in order that there may be no departure of the image from the object plane. By suitable choice of curves the image can be made to lie always in the object plane; and I give below one such system as an example.

Let the toric surface $D_1$ have the powers $+1.2279$ diopters and $+4.7986$ diopters in the two mediadians. Let the toric surface $D_2$ have the powers $-1.2300$ diopters and $-9.7540$ diopters in the respective meridians. Let this lens I be 1.371 mm. thick in the center. Let the toric surface $D_3$ have the powers 1.2300 diopters and 9.7540 diopters in the respective meridians. Let the toric surface $D_4$ have the powers $-1.24$ diopters and $-7.3893$ diopters in the respective meridians. Let this lens be 3.046 mm. thick in the center. Let the toric surface $D_5$ have the powers 1.24 diopters and 7.3893 diopters in the respective meridians. Let the toric surface $D_6$ have the powers $-1.25$ diopters and $-5.00$ diopters in the respective meridians. Let this lens be 3.046 mm. thick in the center. It is again assumed that the index of refraction of the glass is 1.523, that the object is at a distance of 400 mm. from the surface $D_6$ and that the scale is based on 2.00 mm. movement for each percent of reciprocal magnification. When magnification is unity the separation between surfaces $D_2$ and $D_3$ is 2 mm.; and the separation between surfaces $D_4$ and $D_5$ is 3.10 mm. Lens III is kept at a constant distance from the object plane; and lens I is moved to the left from 0% to $-5$% or more. At the latter reading the separation between surfaces $D_2$ and $D_3$ is 12 mm., while lens II has been moved slightly so that at the $-5$% position of lens I, the separation between $D_4$ and $D_5$ is 4.04 mm. The toric surfaces specified cause the magnification to be always unity on the axis; and it is important that the axes of all three lenses be maintained parallel. This arrangement of lenses provides for measuring cylindrical magnification in the one meridian, 2.00 mm. of motion corresponding to 1% reciprocal magnification.

As applied to the testing and compensating of aniseikonia, both a spherical system and a cylindrical system may be employed simultaneously before an eye which is being tested or compensated. A spherical system, for instance a system such as described in connection with Figs. III and IV, may be employed for measuring or compensating the overall magnification of an eye; and then a cylindrical system, such as just described, may be employed for measuring or compensating the additional magnification in a particular meridian. Where both a spherical and a cylindrical system are before the same eye, the cylindrical system should be in advance of the spherical system, that is farther away from the eye than the spherical system.

It will be apparent from the teaching of the present application that my invention has important advantages in that measurements of reciprocal magnification may be made which are theoretically accurate. It will furthermore be apparent that my invention provides for testing image properties of eyes by effecting continuous changes in the size of the ocular image for a given distance without any change whatsoever in the position of the image in space.

In explaining my invention I have given certain specific applications of the principles of my invention. Variations in the applications of these principles are of course possible. For instance, Figs. III and IV illustrate a system in which the outer lenses are plus in power and the middle lens is minus; instead the middle lens may be plus and the outer lenses minus. I have given examples which, in general, start from a zero position; but it will be obvious that instead of starting from zero, it is quite as feasible to design a system for which the magnification at the zero position is different from unity. The magnification need not stop at 5%, or 10% if larger magnifications are desired; since the principles set forth have practical application to the larger magnifications. It will be understood, therefore, that my invention is not limited to the specific examples illustrated and described, but may be otherwise embodied and practiced within the scope of the following claims.

I claim:

1. An optical device comprising a lens system with lens elements, three of said lens elements cooperating to vary the angular size of the image resulting from the system, means for moving two of said elements according to the relation $$-(1-s_3 D_4)^2 \Delta s_4 = \frac{\Delta s_2 \left[1+\frac{D_{II}}{AD_{III}}\right]^2}{1-\Delta s_2 \left[1+\frac{D_{II}}{AD_{III}}\right] D_{II}}$$

to vary the reciprocal magnification while maintaining the effective power constant, where $s_3$ indicates the thickness of the middle lens element of the three, $D_4$ indicates the surface power of that surface of the middle lens element which is next the other movable lens element, $\Delta s_4$ indicates the change in the separation between the movable lens elements, $\Delta s_2$ indicates the change in the separation between the fixed and middle lens elements, $D_{II}$ indicates the effective power of said middle lens element, and $AD_{III}$ is the additive power of said other movable lens element with respect to the middle lens element, and measuring means having an element movable with each of said movable lens elements for indicating the changes in separation between said movable lens elements and thereby measuring variations in reciprocal magnification of the lens system.

2. An optical device comprising a lens system as defined in claim 1 provided with means graduated in accordance with the relation $$\frac{\Delta M_p}{M_p} = \frac{\Delta S_p}{S_p}$$

for measuring the variation in reciprocal magnification, where $M_p$ indicates the reciprocal magnification of the lens system, $\Delta M_p$ indicates the change in said reciprocal magnification, $S_p$ indicates the shape factor in said reciprocal magnification, and $\Delta S_p$ indicates the change in said shape factor.

3. An optical device comprising a terrascopic lens system with lens elements, three of said lens elements cooperating to vary the angular size of the image resulting from the system, the one nearest the object plane of the system being fixed and having a focal length equal to its distance from said object plane, and means for moving the others of said three elements according to the relations $$\Delta v_6 = \frac{-(1-s_1 D_2)^2 \left(\frac{1}{EFL_{II}}\right)^2 \Delta s_2}{\left\{\frac{1}{EFL_I} \cdot S_{I+II} + \frac{1}{EFL_{II}}\right\}\left\{\frac{1}{EFL_I} \cdot S_{I+II} + \frac{1}{EFL_{II}} - (1-s_1 D_2)\frac{1}{EFL_I} \cdot \frac{1}{EFL_{II}} \cdot \Delta s_2\right\}}$$

and $$\Delta v_6 + \Delta s_2 + \Delta s_4 = 0$$

to keep the image and object planes coincident, where $s_1$ indicates the thickness of the outer of said movable lens elements, $D_2$ indicates the surface power of that surface of said outer lens element which is next the middle lens element, $\Delta s_2$ indicates the change in the separation between the movable lens elements, $\Delta s_4$ indicates the change in the separation between the middle and the fixed lens elements, $\Delta v_6$ indicates the change in the distance from the outside surface of said outer lens element to the common object-image plane, $S_{I+II}$ indicates the shape term for the four refracting surfaces of the movable lens elements, and $$\frac{1}{EFL_I} \text{ and } \frac{1}{EFL_{II}}$$

indicate the equivalent powers of said outer and middle lens elements respectively.

4. An optical device comprising a terrascopic lens system as defined in claim 3 provided with means graduated in accordance with the relation $$\Delta \frac{1}{M} = u_1(1 - s_5 \overline{D_6}) \frac{1}{EFL_I} \cdot \frac{1}{EFL_{II}} \cdot \Delta s_2$$

where $$\Delta \frac{1}{M}$$

indicates the change in the reciprocal magnification, $u_1$ indicates the distance from the object to the nearest surface of the fixed lens elements, $s_5$ indicates the thickness of said fixed lens element, and $$\overline{D_6}$$

indicates the computed power which said nearest surface would be required to have in order to produce the same vergency if the object distance were infinite.

5. A device of the character described, comprising a lens system composed of three aligned lens elements of controlled thickness values, the two outer lens elements being of plus power and the intermediate lens element of a minus power, said lenses having optical characteristics which, when the said lenses are in a given related relationship, the system will have substantially no reciprocal magnification and substantially zero power, at least one of said outer lenses of the system being held stationary and in controlled spaced relationship with the other outer lens of said system, said intermediate lens mounted for movement in a direction axial of said lens system toward one or the other of said outer lenses, the said lenses of said optical system having such optical characteristics that when said intermediate lens is moved toward one of the outer lenses, the system will have, at given adjusted positions, different minus reciprocal magnification with substantially little, if any, introduction of focal power, and when moved toward the other outer lens of the system, will have, at different adjusted positions, a given plus reciprocal magnification with the introduction of little, if any, focal power, linear scale means coacting with said intermediate adjustable lens of the system for determining both the plus and minus reciprocal magnification values at given adjusted positions of said intermediate lens and said assembled device embodying means for compensating for any change of focal power introduced in the system by the movement of said intermediate lens, whereby only the true reciprocal magnification value is given at different adjusted positions of said intermediate lens.

ANNA ESTELLE GLANCY.